United States Patent
Domian et al.

[11] Patent Number: 5,997,433
[45] Date of Patent: Dec. 7, 1999

[54] TRANSMISSION CONTROL SYSTEM FOR REDUCING THERMAL LOAD ON ENGAGING ELEMENTS

[75] Inventors: Hans-Jörg Domian, Immenstaad; Ralf Dreibholz, Meckenbeuren, both of Germany

[73] Assignee: ZF Friedrichshafen AG, Friedrichshafen, Germany

[21] Appl. No.: 09/091,039
[22] PCT Filed: Dec. 27, 1996
[86] PCT No.: PCT/EP96/05848
  § 371 Date: Jun. 8, 1998
  § 102(e) Date: Jun. 8, 1998
[87] PCT Pub. No.: WO97/25556
  PCT Pub. Date: Jul. 17, 1997

[30] Foreign Application Priority Data

Jan. 11, 1996 [DE] Germany .......................... 196 00 739

[51] Int. Cl.$^6$ .................................................. F16H 61/08
[52] U.S. Cl. .............................. 477/98; 477/97; 477/76; 477/176; 192/48.1; 192/82 T; 192/3.58; 192/87.11
[58] Field of Search .............................. 74/331, 359, 360, 74/346; 192/48.8, 48.9, 87.11, 87.12, 87.14, 3.58, 82 T, 103 R, 48.1; 475/116–120; 477/76, 174, 175, 176, 98

[56] References Cited

U.S. PATENT DOCUMENTS

| | | | |
|---|---|---|---|
| 4,576,263 | 3/1986 | Lane et al. ............................. | 477/76 X |
| 4,771,648 | 9/1988 | Bardoll ...................................... | 74/359 |
| 5,337,866 | 8/1994 | Sturner et al. ........................... | 477/175 |
| 5,367,914 | 11/1994 | Ordo ......................................... | 74/331 |
| 5,493,927 | 2/1996 | Botterill et al. .......................... | 74/331 |

FOREIGN PATENT DOCUMENTS

| | | |
|---|---|---|
| 0 289 466 A2 | 11/1988 | European Pat. Off. . |
| 0 688 974 A1 | 12/1995 | European Pat. Off. . |
| 35 46 454 A1 | 2/1987 | Germany . |
| 38 12 327 A1 | 6/1989 | Germany . |

OTHER PUBLICATIONS

Japanese Abstract, vol. 016, No. 002 (M–1197) dated Jan. 7, 1992.

*Primary Examiner*—Rodney H. Bonck
*Assistant Examiner*—Ankur Parekh
*Attorney, Agent, or Firm*—Davis and Bujold

[57] ABSTRACT

A transmission control system is proposed for reducing thermal load on engaging elements (2, 3, 4, 5) in a gearbox (1) during the starting operation. The gearbox (1) has an input shaft (7) and an output shaft (9) and at least two engaging elements or clutches (2, 3, 4, 5) each of which is allocated to a gear and comprises a first clutch half (21, 31, 41, 51) which transmits the force coming from the direction of the input shaft (7) onto a second clutch half (22, 32, 42, 52) which in turn transmits the force in the direction of the output shaft (9). Transmission elements (11, 12, 13) and shafts (7, 8, 9, 23, 33, 40, 50) are mounted between the input shaft (7) and a first clutch (2, 3) and/or between the first clutch (2, 3) and a second clutch (4, 5) and/or between the second clutch (4, 5) and a further clutch or the output shaft (9). The engaging elements (2, 3, 4, 5) are actuated via an actuation system (17) by a regulation and control unit (14) which receives system status data from sensors in such a way that at least two of the engaging elements (2, 3, 4, 5) are actuated simultaneously during the starting operation.

10 Claims, 1 Drawing Sheet

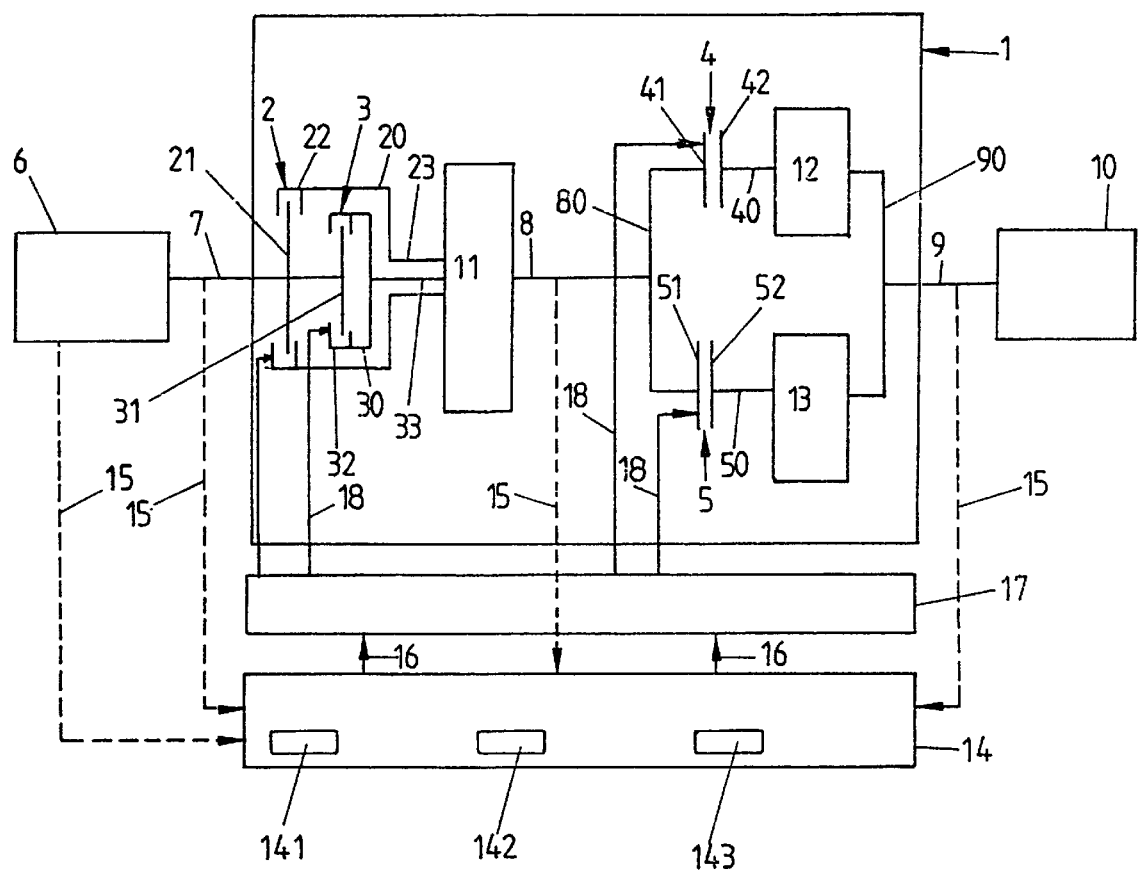

5,997,433

TRANSMISSION CONTROL SYSTEM FOR REDUCING THERMAL LOAD ON ENGAGING ELEMENTS

BACKGROUND OF THE INVENTION

In the transmissions known from the practice which are capable of making the starting operation possible without special starting elements, such as a fluid clutch, a converter, or a separate starting clutch, the engaging elements that slip during the starting operation are exposed to high thermal loads. The clutch has to absorb the complete power loss or frictional energy particularly when the starting operation is effected via a single engaging element or a single clutch. This high load requires a correspondingly sturdy design of the clutch, which disadvantageously entails the need of larger space, greater weight of the engaging elements and elevated production costs.

DE 38 12 327 has disclosed a process for adjusting a double-clutch transmission and a double-clutch transmission of a motor vehicle. The double-clutch has one input shaft and one output shaft which can be interconnected by spur-toothed gear pairs selectively meshable. One first clutch and one second clutch are provided in which the halves of the first clutch are non-rotatably connected with the input shaft and the halves of the second clutch with a shaft or a hollow shaft surrounding the shaft. Engaging means serve to actuate the clutches in order to drive in one gear the force flow between input and output shafts via the clutch, the shaft, the gearshift sleeves and a first set of gear pairs or, in an adjoining gear via the second clutch, the hollow shaft, gearshift sleeves and a second set of gear pairs. When starting the motor vehicle, one appertaining clutch and one appertaining gearshift sleeve of one gear, and the outer clutch and one gearshift sleeve of another gear allocated to the other clutch are simultaneously actuated. Then when the output speed of the clutch of one of the gears reaches the input speed thereof, the force flow is interrupted in the gear.

For the friction or friction work of the starting clutch or starting clutches for a double-clutch transmission in which both input clutches are used for starting, this known process or this double-clutch transmission constitutes a possibility of reducing the thermal load. The proposed process does offer the advantage that the considerable energy produced on the friction surfaces when starting, which is converted to heat in the clutches, has not been absorbed by only one engaging element but is distributed between two engaging elements. But the distribution takes place uniformly and independently of the temporary operating condition of the clutch so that it can result in an overheating and thermal overstress of a clutch which, for example, already has greater wear phenomena than the other clutch.

In addition, it is disadvantageous that the process can be used only in double-clutch transmissions in which the input shaft and the output shaft are interconnected by spur-toothed and selectively meshable gear pairs.

It is further disadvantageous that the process is inadequate or only limitedly adequate mainly for transmissions with a serial arrangement of the engaging elements.

Another considerable disadvantage of this process is that, prior to terminating the starting operation, one clutch that must not be engaged for the subsequent travel has to be disengaged. By opening the engaging element or the clutch, or by actuating the gearshift sleeve, the positive engagement for the gear ratio after starting is thus undesirably interrupted.

SUMMARY OF THE INVENTION

Therefore, the problem on which the invention is based is to develop a transmission control of, the kind mentioned above, in the sense of preventing in any transmission design a thermal overstressing of the engaging elements involved in the starting operation and, at the same time, to maintain a power flow required for the desired ratio.

The transmission control, according to the invention, advantageously makes possible adapting the thermal load to an individual state of the engaging elements, that take part in the starting operation, whereby they can be made smaller and yet are not overheated by the great friction load.

The advantage resulting therefrom is that the installation space needed, the cost and the weight of the engaging elements can be clearly reduced.

Besides, the service life of the engaging elements concerned can be extended by reducing and adapting the thermal load to them by means of a transmission control according to the invention.

The transmission control of the invention offers the added advantage that, independently of the type and design of the transmission, such as a planetary transmission, a counter-shaft transmission or any other transmission, it can always be used when several engaging elements have to be activated to produce and maintain the gear ratio with which it must be started.

This universally applicable transmission control recommends itself also for continuous transmissions insofar as several engaging elements are needed for producing the desired starting ratio.

Since the engaging elements involved in the starting operation remain engaged after termination of the starting operation, the power flow needed for the desired transmission ratio can be advantageously produced and maintained.

The transmission control, according to the invention, also can be advantageously used in any desired arrangement of the engaging elements. Thus, for example, the engaging elements concerned can be disposed in parallel or serially relative to each other, the friction work being reduced in the parallel arrangement of the engaging elements by distributing the torque to be transmitted and, in the serial arrangement, the friction work is reduced by distributing the speed difference existing between transmission input and transmission output among several engaging elements.

Other advantages and advantageous developments of the invention result from the sub-claims and from the embodiment described below, in more detail, with reference to the enclosed drawing.

BRIEF DESCRIPTION OF THE DRAWING

The drawing shows very schematized a fundamental illustration of an imaginary transmission having a transmission control shown for explaining the transmission control according to the invention.

DESCRIPTION OF THE PREFERRED EMBODIMENT(S)

Referring to the drawing, transmission 1 has three transmission elements 11, 12, 13 and four engaging elements 2, 3, 4, 5, first, third, second, fourth, respectively allocated to one respective gear. The engaging elements are designed as adjustable friction clutches but they can, alternatively, be designed also as brakes in another embodiment. The transmission elements 11, 12, 13 constitute independent gears and are to be regarded as part of the transmission 1.

In the shown embodiment an engine is indicated with 6, very schematized, which drives an input shaft 7 of the transmission 1, the input shaft 7 being connected with a first clutch half 21 of the clutch 2. From the first clutch half 21, according to the speed n7 of the input shaft 7, power can be transmitted to a second clutch half 22 of the clutch 2 from where the force flow is passed on, via a rotary part 20, to the transmission element 11.

As an alternative to this, it is also possible to pass the force flow to the transmission element 11 via the input shaft 7 and a first clutch half 31 of the clutch 3 and the second clutch half 32 thereof, a rotary part 30 connected therewith, and a shaft 33 attached thereto.

In the embodiment shown, the transmission element 11 is designed as a planetary transmission with three connections for a hollow shaft 23, the shaft 33 and a shaft 8 (transmission element output shaft) leading further on the output side at the speed n8 or the angular velocity ω8.

Obviously, instead of the planetary transmission 11, it is possible to use transmission elements of a different transmission design such as a spur gear transmission which effect a change in ratio.

The shaft 8 is connected with a first clutch half 41 of the clutch 4 and a first clutch half 51 of the clutch 5 by a rotary part 80. Depending on the clutch 4 or the clutch 5 being engaged or disengaged, a force or power flow dependent on the angular velocity ω8 of the shaft 8 can be passed, at speed n40, to the transmission element 12 via a shaft 40 connected with the second clutch half 42 of the clutch 4, or from the second clutch half 52 of the clutch 5 and a shaft 50 connected therewith, at the speed n50, to the transmission element 13. From the transmission element 12 or 13, where a gear reduction occurs, the force or power is transmitted, via a rotary part 90, to an output shaft 9 which leads to a diagrammatically shown output designated with 10.

In what follows is considered a force or power flow from the engine 6, via the clutch 2, to the transmission element 11, from the transmission element 11, via the clutch 5, to the transmission element 13 and from there to the output 10, the resulting friction work being distributed, during a starting operation, between the involved clutches 2 and 5 so as to prevent a thermal overstress of the clutches 2 and 5.

When starting with the power flow or in a gear, the whole friction work or power losses occurring during the starting operation is distributed between the engaging elements 2 and 5 which, in the instant embodiment, are arranged in a row, that is, serially in a manner such that the percent distribution of the total friction work P__Rges is adapted to the specific thermal load capacity of the transmission element.

During the starting operation, the engine 6 delivers the torque T__mot. The clutch 2, during the starting phase, transmits the torque T2=T__mot. As long as the clutch 2 is in a slipping phase, a differential angular velocity Δω2 exists on said clutch. The friction work on the clutch 2 thus amounts to P__2=T__2×Δω2. If the clutch 5 is simultaneously allowed to slip relative to the clutch 2, then a differential angular velocity Δω5 prevails on the clutch 5. The clutch 5 transmits a torque T__5, said torque T__5 corresponding to the product from the torque T__2 and one ratio i__11 of the transmission element 11. The friction work P__5 existing on the clutch 5, in this case, corresponds to the product of the torque T__5 and the differential angular velocity Δω5. The sum of both friction works P__2 and P__5, produced in the clutches 2 and 5, corresponds to the total friction work P__Rges, which also can be given as P__Rges= T__6×(ω6−i×ω10) wherein i=i__11×i__13, i__11 is given for the ratio of the transmission element 11, i__13 for the ratio of the transmission element 13 and ω10 for the angular velocity of the output 10.

The differential angular velocities Δω2 and Δω5 are known, at any time, by measuring or calculation. For this purpose, sensors, not shown in greater detail, are provided in the transmission 1 which detect the operating status data, such as speed and temperature on the shafts 7, 8, 9, 23, 33, 40, 50, the transmission elements 2, 3, 4, 5, the engine 6, and the output 10, and transmits them to a regulation and control unit 14, which in the drawing, is shown by way of example as a few arrows 15.

The differential angular velocities Δω2 and Δω5 can be directly controlled by clutch torques or friction torques on the clutches 2 and 5, while the clutches 2 and 5 can be controlled or actuated with pressure of different strength. If, for example, the pressure on the clutch 2 is increased, the differential angular velocity Δω2 decreases according to the magnitude of the pressure applied. The same also applies to the clutch 5, thus, depending on the operating status detected by the sensors, it is possible, by the regulation and control unit 14 which gives commands (indicated by arrows 16) to an adequate actuator system 17, to adjust for the parts involved in the starting operation, the pressure on the clutches 2 and 5, via the actuator system 17, according to the thermal load and load capacity of the clutches. By way of example, the control by the actuator system 17 of the parts involved, especially the engaging elements 2, 3, 4, 5, is indicated in the drawing by a few arrows 18.

The speed of the intermediate shaft 8, in relation to the speed of the input shaft 7 or the speed of the output shaft 9, can be adjusted via the pressure on the clutches 2 and 5 and thus, also via the clutch, torques appearing thereon.

According to the individual thermal load capacity of the clutches 2 and 5, nominal values for the differential angular velocities Δω2 and Δω5 exist on the regulation and control unit 14. If the portion of the total friction work P__Rges, which the clutch 2 handles, is reduced and the portion of the clutch 5 is correspondingly increased, then the amount of the differential angular velocity Δω2 must be reduced and the amount of the differential angular velocity Δω5 increased. This is obtained by briefly lowering the torque T__5 on the clutch 5 by reducing the pressure on the clutch 5 by means of a command (shown by arrow 18) issuing from the actuator system 17.

A hydraulic system (not shown), required for adjusting the pressure on the clutches 2, 3, 4, 5, is controlled by an electronic system corresponding to the general prior art.

During a reduction of the torque in the clutch 5, when the hydraulic system is electronically controlled with a pressure regulator (not shown) in a manner such that the pressure on the clutch 5 is reduced, an acceleration torque acts upon the shaft 8, between the transmission element 11 and the clutch 5, whereby the amount of the angular velocity ω8 of the shaft increases. The acceleration torque on the shaft 8 is produced by the angular velocity of the shaft 8 increasing during a reduction of the torque T__5 or during an increase of the torque T__5.

The angular velocity ω6 of the engine 6 and the angular velocity ω10 of the output 10 do not change, or only change slightly, during all this period of time.

The differential angular velocity Δω2 which corresponds to the difference between the angular velocity ω23 of the hollow shaft 23 and the angular velocity ω7 of the input shaft 7, therefore decreases while, on the other hand, the differential angular velocity Δω5 which corresponds to the difference between the angular velocity ω8 of the shaft 8 and the angular velocity ω50 of the shaft 50, increases. In this manner, an increase results on the clutch 5 by an amount ΔP__R of the portion of the total friction work P__Rges.

The thermal load on the clutch 2, on the other hand, is reduced by the amount ΔP_R. Therefore, the distribution of the friction work and thus the thermal load of the engaging elements can be continuously varied.

As already described, the clutches 2, 3, 4, 5 are controlled, via the actuator system 17, by the regulation and control unit 14. The actuator system 16, shown only extensively schematized in the drawing, is designed as an electronically controlled hydraulic system with actuators for control of the pressure passed to the clutches 2, 3, 4, 5. The actuator system 17 contains actuators, likewise not further illustrated, for additional engaging elements such as pedals.

The regulation and control unit 14, which gives commands to the actuator system 17, indicated as arrows 16, receives, via sensors not shown in detail, information about the status of the system, such as the speeds of the individual shafts, the temperature existing in the engaging elements, the position of an accelerator pedal, etc., and therefrom permanently determines adequate values for the actuators of the actuator system 17. The regulation and control unit 14 contains, for this purpose, a nominal value generator 141, a regulation equipment 142 and a measured value processing device 143. The information concerning the operating status, that enters in the regulation and control unit 14, is compared with nominal values composed of a controlled and a regulated portion. While, via the irreversible control portion, known effects on the operation, such as results from an accelerator pedal position, are taken into account, the parameters affected by the operation are taken into account via the regulated portion. The task of the regulation and control unit 14 consists mainly of ensuring a distribution of the total friction work P_Rges in accordance with the thermal load capacity of the engaging elements concerned. The overstress of the engaging elements is thus prevented.

The engaging elements 2 and 5 (or 2 and 4, or 3 and 5, or 3 and 4) remain engaged even after the starting operation or are in the power or torque flow after the starting operation. The operation is thus carried out with several engaging elements, not only in the starting state but also in the engaged state.

The engaged state of an engaging element is characterized here by the fact that it either adheres or slips regulated with a slight differential speed or an angular velocity.

The basic idea of the invention, namely, the reduction of the thermal load of the engaging elements, in accordance with their specific conditions and dimensions determined by the material, is obviously independent of the above described embodiment. The imaginary transmission described in the embodiment represents only a preferred design which can be altered in many ways.

In a different design of the transmission, the transmission elements 11, 12, 13, for example, can be arranged in another position such as between the input shaft 7 and an engaging element 2, 3 or between the engaging elements 4, 5 and other engaging elements or the output shaft 9. By engaging element is to be understood both as a clutch and as a brake.

Besides, together with the serial arrangement of the engaging elements described in the embodiment, a parallel arrangement of the engaging elements is also possible, especially when using planetary or epicyclic transmissions. The advantages of the transmission control with a serial arrangement of the engaging elements, described with reference to the embodiment, can also be obtained preferably with a planetary transmission having a parallel arrangement of the engaging elements, since a planetary transmission, because of its physical conditions and higher degree of freedom, can be designed in any shape, that is, also without non-rotatably conditions, the arrangement in parallel of the engaging elements corresponding in principle to a serial arrangement of a countershaft transmission.

As another variation in the design of the transmission, the actuator system 17 also can be obviously designed with a pneumatic system or a mechanical or electric transmission instead of a hydraulic system.

Such variations are evidently within the scope of the invention.

We claim:

1. A transmission and transmission control for varying a thermal load of two engaging elements during a starting phase of the transmission; the transmission having an input shaft, an output shaft, and at least two engaging elements which are each associated with one gear, each said engaging element having a first clutch half for receiving a driving force supplied by said input shaft and a second clutch half for transmitting the supplied driving force toward said output shaft, and a transmission element (11), having a transmission element output shaft, being located in the driving force flow path from said input shaft to said output shaft, said transmission element (11) receiving a driving force from said second clutch half of one of said at least two engaging elements and said transmission element output shaft transmitting driving force to said first clutch half of the other of said at least two engaging elements, and said transmission control comprising:

an actuation device being coupled to said at least first and second engaging elements to facilitate control thereof;

a regulation and control unit (14) communicating with said actuation device and being connected to a sensor for receiving system status data in a manner such that, during a starting operation, at least two of said engaging elements are simultaneously actuated and a resulting friction work of said engaging elements is distributed among the at least two of said engaging elements;

wherein a differential angular velocity (Δω2, Δω3, Δω4, Δω5) existing in each of said engaging elements (2, 3, 4, 5) is directly controlled by a clutch torque in effect at the time, said clutch torque being one of increased and decreased, according to the thermal load and load capacity of the respective engaging elements, by one of supplying to or removing pressure from said engaging elements via said regulation and control unit and said actuation device (17) after said regulation and control unit.

2. The transmission and transmission control according to claim 1, wherein, during operation of said transmission control, said regulation and control unit (14) effects a distribution of a total friction work (P_Rges) which is based on a thermal load capacity of said engaging elements (2, 3, 4, 5).

3. The transmission and transmission control according to claim 1, wherein said regulation and control unit (14) is coupled to a nominal value generator (14), to a regulation device (142) and to a measured value processing device (143).

4. A transmission and transmission control for varying a thermal load between at least first and second engaging elements of the transmission during a starting phase of the transmission, the transmission having an input shaft, an output shaft, each of said at least first and second engaging elements being allocated to one gear and each said engaging element having a first clutch half for receiving a driving force supplied by said input shaft and a second clutch half for transmitting the supplied driving force toward said output shaft, and a transmission element (11), with a transmission element output shaft, being located in a driving force flow path from said input shaft to said output shaft, said transmission element (11) receiving a driving force from said second clutch half of said first engaging element and said transmission element output shaft transmitting driving force to said first clutch half of said second engaging element, and said transmission control comprising:

an actuation device being coupled to said at least first and second engaging elements to facilitate control thereof;

a regulation and control unit communicating with said actuation device, and said regulation and control unit being connected to sensors monitoring said at least first and second engaging elements, each said sensor measuring at least a differential angular velocity and a thermal load of each said engaging elements and transmitting the measured differential angular velocity and the measured thermal load to said regulation and control unit;

the regulation and control unit comparing the measured thermal load to a thermal load capacity of said at least first and second engaging elements and controlling the actuation device to redistribute the thermal load between said at least first and second engaging elements;

wherein the thermal load of each engaging element is less than the thermal load capacity of each respective engaging element, and said actuation device redistributes the thermal load by changing the differential angular velocity existing in said at least first and second engaging elements by one of increasing and decreasing a clutch torque in effect via one of supplying and removing pressure from said at least first and second engaging elements.

5. The transmission and transmission control as set forth in claim 4 wherein, during operation of said transmission control, said the regulation and control unit maintains said at least first and second engaging elements continuously engaged throughout the transmissions operation.

6. The transmission and transmission control according to claim 4, wherein said regulation and control unit (14) effects a distribution of the total friction work (P_Rges) which is based on the thermal load capacity of said engaging elements (2, 3, 4, 5).

7. The transmission and transmission control according to claim 4, wherein said regulation and control unit (14) has a nominal value generator (14), a regulation device (142) and a measured value processing device (143).

8. A transmission and transmission control for varying a thermal load between first, second, third and fourth engaging elements of the transmission during a starting phase of the transmission; the transmission having an input shaft, an output shaft, each of said first, second, third and fourth engaging elements being associated with one gear and each said engaging element having a first clutch half for receiving a driving force supplied by said input shaft and a second clutch half for transmitting the supplied driving force toward said output shaft, and a transmission element (11), having a transmission element output shaft, being located in a driving force flow path from said input shaft to said output shaft, said transmission element (11) receiving an input from both said second clutch half of said first engaging element and said second clutch half of said third engaging element and said transmission element output shaft transmitting the driving force both to said first clutch half of said second engaging element and said first clutch half of said fourth engaging element, and said transmission control comprising:

an actuation device being coupled to said first, second, third and fourth engaging elements to facilitate control thereof;

a regulation and control unit communicating with said actuation device, and said regulation and control unit being connected to sensors monitoring said first, second, third and fourth engaging elements, each said sensor measuring at least a differential angular velocity and a thermal load of each said first, second, third and fourth engaging elements and transmitting the measured differential angular velocity and the measured thermal load to said regulation and control unit;

the regulation and control unit comparing the measured thermal load to a thermal load capacity of said first, second, third and fourth engaging elements and controlling the actuation device to redistribute the thermal load between said first, second, third and fourth engaging elements;

wherein the thermal load of each engaging element is less than the thermal load capacity of each respective engaging element, and said actuation device redistributes the thermal load by changing the differential angular velocity existing in said at least first and second engaging elements by one of increasing and decreasing a clutch torque in effect via one of supplying and removing pressure from said at least first and second engaging elements.

9. The transmission and transmission control according to claim 8, wherein said regulation and control unit (14) effects a distribution of the total friction work (P_Rges) which is based on the thermal load capacity of said engaging elements (2, 3, 4, 5).

10. The transmission and transmission control according to claim 8, wherein said regulation and control unit (14) has a nominal value generator (14), a regulation device (142) and a measured value processing device (143).

* * * * *